United States Patent Office 3,534,116
Patented Oct. 13, 1970

3,534,116
SLURRY ADDUCTION PROCESS
Everett J. Fuller, Gillette, N.J., assignor to Esso Research and Engineering Company, a corporation of Delaware
No Drawing. Filed Oct. 11, 1968, Ser. No. 766,994
Int. Cl. C07c 7/10
U.S. Cl. 260—674
15 Claims

ABSTRACT OF THE DISCLOSURE

A separation process, which utilizes inclusion compounds, e.g. insoluble complexes which form between a suitable compound (host) and at least one constituent of a feed mixture (guest) has been practiced in the presence of a solvent, such solvent having partial solvency for both hosts and guests and also permitting the formation, after complexing, of separate layers, i.e., one containing primarily feed liquor depleted in guest, the other layer containing the solvent and a complex of host and guest slurried therein. This system may not be effectively utilized where the solvent is so soluble in the feedstream that only one liquid phase is formed at equilibrium. The process of this invention effects the formation of two liquid phases in such a system by the addition of a compound which reduces substantially the solubility of the solvent in the feedstream and also has the ability to act as a guest compound for the host.

FIELD OF INVENTION

This invention relates to an improved process for the separation of constituents within a feed mixture. More particularly, this invention relates to a process for separation of constituents within a feed mixture by the formation of an inclusion compound between a host compound or complexing agent such as thiourea and at least one constituent of the feed mixture, hereafter referred to as the guest.

An earlier application, U.S. Ser. No. 741,607, filed July 1, 1968, disclosed a process in which an inert anhydrous solvent is added to a processing sequence wherein such inclusion compounds are formed. The solvent utilized in this process is of such a nature so that after complexation the solvent encourages the formation of separate liquid layers, a top layer containing the feed liquor depleted in guest and the other, or bottom layer, a mixture containing the insoluble complex of host and guest slurried in the solvent.

The instant invention is to be utilized in those instances wherein the solvent is soluble in any of the constituents of the feedstream, including the guest compound, to such an extent that only one liquid and one solid phase result at equilibrium.

PRIOR ART

The use of inclusion compound-forming substances, such as urea, thiourea or the clathrating agents in order to preferentially complex guest molecules is well known in the art. One may find an extensive treatment of this subject in Mandelcorn, Nonstoichiometric Compounds, Academic Press, 1964, herein incorporated by reference.

Briefly, an inclusion compound has two elements, a host and a guest. Data obtained from X-ray studies reveals that the complexes are formed when a guest compound is trapped either in channels, as is the case with urea and thiourea, or in cages, which is the case when one makes use of a clathrating agent. These channels or cages are formed by the continuous crystal lattice of the host compound; such compounds do not obey the law of simple multiple proportions; the molecular ratio of host to guest is not a whole number. Thus, the stability of the complex or adduct depends upon a physical relationship or fit, between the guest molecules and the channels or cages. There need be no specific reaction between the guest molecule and the host. The stability of the various complexes or adducts will vary directly with how close a fit is obtained between the guest and the host cavity.

The various uses for these adducts have been well documented in the literature. Urea is the most commonly used but a wide variety of other compounds perform in a similar fashion. They include thiourea, tri-o-thymotide, 2-methylnaphthalene, 4,4'-dinitrophenyl, choleic acids, and the cyclotriphosphazene derivatives. Additionally, the clathrating agents such as hydroquinone, certain metal-ion Werner complexes, and even ordinary water, as in methane hydrate, behave in a similar fashion. It is known that dry urea will slowly separate elements from hydrocarbon mixtures. It was proposed in the past to accelerate this separation by activating dry urea with promoters such as polar compounds as typified by water or methanol. These processes presented serious disadvantages since urea tended to hydrolyze in the presence of water. Additional difficulties were encountered when one attempted to separate the adduct from the feedstream which was depleted in guest compound. The adduct was difficult to filter because of large pressure drops across the filter cake.

Technically, the commercial adduction processes treated the adduct as a filterable solid in a batch-type operation. These batch operations severely limited commercial development of the inclusion type separation process since the batch operations are generally poorly adapted to large-scale operation, are expensive and require careful control of particle size.

Attempts have been made to introduce a continuous process into the inclusion field. Typical of these is U.S. Pat. 2,632,002 wherein added solids such as silica gel are used to entrain the adduct in a slurry and also encourage additional adduct formation. Nevertheless, this process requires the use of water or similar solvents which create difficulty in the separation of the adduct from the adsorbent. More recently a process was disclosed in Ser. No. 741,607 which was continuous in nature but eliminated the reactive solvents and adsorbent additives of the previous invention. In this process a substantially anhydrous inert solvent was added to the process scheme. The nature of this solvent is such that with the feed stock and the complexing agent, it generates two liquid phases at equilibrium. The top liquid phase or layer contains primarily feedstreams depleted in guest, the other or bottom layer, a slurry, comprising the solvent with a complex of host and guest slurried therein. Adduct is continually precipitated into this layer. The only problem with such a process is encountered when the solvent is so highly soluble in the feedstream, that only one liquid phase results. To recover feedstream depleted in guest compound in this instance one must filter the solid adduct from the depleted feedstream. This amounts essentially to the unimproved separation, since solid adduct cannot now be moved in a slurry.

SUMMARY OF THE INVENTION

In accordance with this invention a method has been devised wherein two separate layers of liquid can be maintained in a system where a liquid feedstream containing a guest compound is contacted with an inclusion compound-forming substance in the presence of an anhydrous, inert solvent; said solvent being soluble enough in the guest depleted feedstream to be totally miscible even in the presence of dissolved host. The separate layers are created by adding to the system an addition compound having the following characteristics: The compound must reduce the solubility of the solvent in the depleted feedstream and the compound further must serve as a guest for the host complexing agent thereby displacing at least a portion of the original guest. In conjunction with this the guest compound must not have a width which is greater than the opening which the host provides. It is apparent, from this description, that few compounds will have all the needed characteristics. One such compound is methylcyclohexane which may be used to aid in the separation of durene from other aromatics. The aromatics present will usually dissolve the solvent and thereby produce only a single liquid layer, the presence of methylcyclohexane encourages the formation of separate layers.

The presence of the addition compound will force the solvent to associate with the adduct phase and assure the presence of the two layers of liquid. In this manner a continuous process for the removal of slurry may readily be effected since the depleted feedstream may be continuously decanted from the slurry mixture. The feedstream will not be greatly diluted by the added compound since the ability of this compound to serve as a guest within the complexing agent will direct a major portion of the compound into the bottom slurry layer rather than the top layer of guest depleted feedstream.

In a preferred embodiment of this invention, after the decantation of the guest depleted feedstream, the guest may be recovered from slurry by adding excess addition compound and mixing, preferably while warming the slurry slightly. The excess of this added compound, which by definition must also serve as a guest, displaces the equilibrium in the system toward the formation of an adduct including the added compound as a guest. The original guest is displaced and may then be recovered by conventional stripping means. The additional heat is helpful since complexes are in general less stable at higher temperatures and this will tend to accelerate the removal of the guest.

While not wishing to be bound by any particular mechanism, it is believed that the following accounts for the results achieved with the instant invention.

The substance to be added is in general poorly miscible with the solvent; and especially so by comparison with the feedstream. This promotes the formation of the second liquid phase, since in general the amounts of two poorly miscible liquids which can be dissolved in a given amount of a third liquid, i.e. feedstream, is limited. That the substance to be added does not entirely prefer the depleted feedstream is necessary, otherwise the concentration of desired guest in the feed could be reduced to an impractically low level; such that no complex would form.

Since host and guest are compounds which will have an affinity for each other they will continually complex and precipitate from the solution. Thus, the equilibrium will shift toward adduct formation allowing more host and more guest to dissolve while the clathrate or adduct precipitates from solution. It is apparent that eventually substantially all of the guest compound will precipitate, the limit being defined by the equilibrium constant.

A variety of solvents may be utilized in the instant invention. The solvents, however, must have certain characteristics. Of paramount importance is the ability to form the previously mentioned two liquid phases at equilibrium when the addition compound is present. The solvent should also be substantially non-reactive with respect to the host and guest compound; the complex formed by host and guest compound must be substantially insoluble in the equilibrated system. Generally, one may utilize as solvents esters, ether alcohols and polyols.

Ether alcohols useful as solvents in this invention may be represented by the generic formula R—O—R'—OH wherein R is an alkyl or alkoxy radical and R' is an alkylene radical. Typical examples of such compounds are 2-methoxy ethanol, glycols, glycerol and diethylene glycol. The polyols applicable herein are exemplified by diethylene glycol, ethylene glycol, glycerol, acetic acid esters of glycerol, e.g. monoacetin. Other compounds include furfuryl alcohol, n-methylpyrrolidone, propylene carbonate, 1-piperazine ethanol, 2-chloroethanol and mixtures thereof. The less preferred solvents include furfuryl alcohol which is relatively unstable and propylene carbonate which tends to pyrolyze during distillation. The most preferred solvent is 2-methoxy ethanol which readily promotes both adduct and slurry formation. The 2-methoxy ethanol may readily be distilled from aromatics in the $C_{10}$–$C_{16}$ range. The solvents must, of course, be liquid at the temperatures of operation, e.g. $-50$ to $180°$ C. It would be obvious to one skilled in the art to vary the conditions of operation and thereby liquefy a desired solvent. Urea and thiourea are the most widely used inclusion compound formers. In general, complexing agents which dissolve in polar solvents such as water may be utilized successfully by the process of this invention. Solubility in aromatic solvents, on the other hand, is a property of the complexing agent not compatible with this invention. Complexing agents in the latter category include the methylnaphthalenes, triphenylmethane derivatives, and the tricyclophosphazene derivatives.

The feedstreams which contain compounds in which the solvent is soluble and thus would require the addition compound of the instant invention and those which contain sufficient aromatic hydrocarbons such as benzene, toluene, xylenes, etc. to make a second liquid phase impossible with the particular solvent employed. Obviously, this depends upon the solvent and the complex solubility relationships which hold in the solvent-complexing agent-feedstock system. This type of feedstream is exemplified by the $C_6$–$C_{16}$ aromatic naphthas. An especially difficult recovery to be made by slurry adduction is that of durene from admixture with other aromatics since these aromatics will dissolve the solvents generally employed. The particularly preferred addition compound is methylcyclohexane. Other preferred addition compounds are cyclohexane, methylcyclopentane, 2,2-dimethylbutane, triptane, isopropylcyclohexane, and 2,2,4-trimethylpentane. The individual addition compounds which will be satisfactory for this invention may only be determined on an individual basis. Other satisfactory addition compounds include triptane, 2,2,4,4-tetramethylpentane, 2,6,9,12,16-pentamethyl heptadecane, squalene, squalane, cyclopentane, cyclooctane, 1,2-dicyclohexylethane, bicyclohexyl, 1,3-dicyclopentyl cyclopentane, decalin, 2,3-dimethyl-1,3-butadiene; some ketones such as cyclopentanone, n-hexylcyclohexane and cyclohexanol. For a thiourea system the width of the addition compound cannot be greater than 6.1 angstroms; when utilizing a urea system the width of the addition compound cannot be more than 5.25 angstroms.

Processing conditions for the system described herein will, of course, vary widely with the particular system utilized. In general, there are no critical limitations and it is only necessary that the system be maintained as a liquid-liquid or slurry system. In a urea or a thiourea system temperatures will normally range from about $-50°$ C. to about $+180°$ C., preferred temperatures would range between $-10°$ C. and $100°$ C. These extremes are dictated by the fact that below $-50°$ C., the components begin to solidify, solutions become more viscous thereby inhibiting pumping and equilibrium solubilities are lower. Above about $180°$ C. thiourea melts and its adducts are generally unstable. Urea will melt at about $132°$ C. Pressures are not critical and the process may be conducted at subatmospheric pressures such as $\frac{1}{10}$ of an atmosphere up to superatmospheric such as about 50 atmospheres. Ambient pressures are normally most convenient and are preferred.

Reaction periods will also vary widely and are generally not critical. They should be of a duration sufficient to establish equilibrium in the system. This may range from a few seconds up to as much as 8 hours or even more. Preferably, the reaction period, for the formation of the adduct and the separate liquid levels should be under 30 minutes.

The quantity of solvent employed need only be sufficient to allow the formation of a two-liquid phase system and will generally range, on a weight basis, between about 1/10 to 10 times the amount of host needed, depending on the pumps and process equipment used. The amount of host, urea and thiourea, in relation to separable feed constituent, or guest, ranges from about 1 to 3.5 parts urea by weight per part separable constituent, and from about 1.5 to 3 parts thiourea by weight per part separable constituent. In individual cases one gram of cyclohexane would require about 2.7 grams of thiourea for complexing and 1 gram of n-dodecane requires 3.3 grams of urea for complexing. The exact amounts will vary and can readily be determined by one skilled in the art. The amount of addition compound may also vary widely. Generally, 10 to 200 wt. percent of the solvent, preferably 50 to 150 wt. percent of the solvent, will suffice.

In a preferred embodiment of this invention, durene may be separated from a feedstream containing other aromatics such as isodurene, mesitylene, and $C_8$–$C_{16}$ aromatic isomers in general. The feedstream may contain 2 to 90 wt. percent durene. The feedstream is contacted, at a temperature of −30 to 120° C. and ambient pressure with a mixture of from 10 to 60 wt. percent thiourea, 5 to 90 wt. percent of 2-methoxyethanol and 1 to 60 wt. percent of methyl cyclohexane; in a suitable mixing device. Contacting times will vary with durene feed concentration, temperature, composition of the thiourea-2-methoxyethanol-methylcyclohexane mixture, and the type of mixing device employed, but will be in the range of from 2 seconds to 30 minutes per operating stage. Two liquid phases result with a solid phase slurried within the bottom liquid phase. The top liquid layer, or raffinate, is mainly depleted feedstream and ordinarily contains about 5 to 60% of the methylcyclohexane added and about 2 to 60% of the 2-methoxyethanol solvent added. The solvent and methylcyclohexane may be removed by flash distillation from the raffinate. The bottom liquid layer is mixed with solid adduct of durene-methylcyclohexane. Removal of the durene from the adduct slurry is accomplished, after removal of the raffinate, by mixing the slurry with enough methylcyclohexane to displace most of the durene from adduct at equilibrium. Simultaneously, the methylcyclohexane may be heated to a temperature of 50 to 100° C. The durene washes out of the slurry into the methylcyclohexane layer, which may be pumped off and flash distilled to recover methylcyclohexane and durene product.

The presence of the methyl cyclohexane will force the solvent to associate with the adduct phase and assure the presence of the two layers of liquid. In this manner a continuous process for the removal of slurry may readily be effected since the depleted feedstream may be continuously decanted from the slurry phase. The feedstream will not be diluted to the point of non-complexation of durene by the added compound since the ability of this compound to serve as a guest within the complexing agent will direct a major portion of the compound into the slurry layer rather than the layer of guest depleted feedstream.

After the decantation of the guest depleted feedstream the guest may be recovered from the slurry by adding excess addition compound and mixing, preferably while warming the slurry slightly. The excess of this added compound, which by definition must also serve as a guest in the adduct phase, displaces the equilibrium in the system toward the formation of an adduct including the added compound as guest. The original guest is displaced and may then be recovered from solution by conventional distillation. The additional heat is helpful since complexes are in general less stable at higher temperatures and this will tend to accelerate the removal of the guest.

SPECIFIC EMBODIMENTS

Example 1

This example illustrates the separation of durene from a mixture with xylene; the mixture contained 10% durene by weight and 90% xylene in solution. Initially, the host compound, 5 grams of thiourea, was introduced into a container. Following this 5 ml. of 2-methoxy ethanol, and 4 ml. of methylcyclohexane were added and the mixture was mixed for 15 minutes at 80° C. to approximate a slurry which was being recycled back to the extractor. Mixing was done in a 25 ml. container by a "Vibro-Mixer" small amplitude high frequency vibrating plate. At this point 12 ml. of the 10% durene solution was added and the system was again mixed for 15 minutes at 12° C. in the same apparatus. A layer of liquid was then observed resting on a layer of slurry; the liquid layer was analyzed by vapor-phase chromatography.

The slurry phase was also analyzed. Thiourea was determined by distilling all the liquids off a weighed sample on a vacuum-line, and the hydrocarbons were analyzed by vapor-phase chromatography. The slurry contained 59% of the total durene. The distribution of all components is shown in Table 1 included below. It is evident that durene and xylene were effectively separated by the process. Indeed, the separation factor, $\alpha$, defined by $$\alpha = \frac{(\text{durene/xylene}) \text{ slurry}}{(\text{durene/xylene}) \text{ liquid}} \text{ is } 12.5$$

TABLE I.—THIOUREA SLURRY RECOVERY OF DURENE PHASE

| Substance | Charged, g. | Top liquid, g. | Slurry, g. |
|---|---|---|---|
| Thiourea | 5.0 | | 5.0 |
| 2-methoxyethanol | 4.83 | 2 | 2.82 |
| Methylcyclohexane | 3.07 | 1.33 | 1.7 |
| Xylene | 10.4 | 9.3 | 1.1 |
| Durene | 1.04 | 0.42 | 0.62 |
| | 24.34 | 13.3 | 11.0 |

Example 2

In this example the exact conditions of the previous example with respect to quantities and physical operating conditions were utilized to prepare an adduct slurry. The top layer was decanted and the slurry was then mixed in the Vibro-Mixer at 80° C. for 15 minutes with 16 additional milliliters of methylcyclohexane. Again, a liquid layer was found on top of the slurry layer. Analysis by the same techniques mentioned above produced the results shown in Table II, which indicate that 92% of the durene had been extracted into the top layer of liquid.

TABLE II.—STRIPPING OF DURENE FROM ADDUCT SLURRY

| Substance | Charged, g.[1] | Top liquid, g. | Slurry, g |
|---|---|---|---|
| Thiourea | 5.0 | | 5.0 |
| 2-methoxyethanol | 6.5 | 3.58 | 2.96 |
| Methylcyclohexane | 14.0 | 7.3 | 6.74 |
| Xylene | 2.3 | 2.2 | 0.14 |
| Durene | 0.69 | 0.64 | 0.05 |
| | 28.5 | 13.7 | 14.89 |

[1] Adduct slurry + added methylcyclohexane. Proportions slightly different from slurry of Table I because of imprecise washing.

This example serves to illustrate that the durene product is efficiently stripped from thiourea adduct by mixing with an excess of warm methylcyclohexane. Final product recovery would consist of flashing the methylcyclohexane and 2-methoxyethanol solvent from the top liquid layer after the stripping operation. The slurry components would be recycled to the extraction unit for more durene recovery.

It should be noted that slurry processing allows a multistage operation, and that the final product slurry to be stripped should contain only thiourea, 2-methoxyethanol, methylcyclohexane, and durene. The other components of the feedstock should be readily removed over a few stages of extraction. These examples represent equilibrium data over only one stage of operation.

Example 3

To illustrate the improvement of the instant invention another adduct mixture was prepared, this time without the methylcyclohexane addition compound. In this example, 5 grams of thiourea were mixed at a temperature of 12° C. with 5 milliliters of 2-methoxyethanol and 16 milliliters of 10% by weight durene and 90% by weight xylene. The mixing done in the same way as in the above examples, continued for a period of about 15 minutes. The solid phase which resulted was powdery in appearance after mixing, and so dispersed throughout the liquid that analysis of the two phases (one liquid and one solid) was delayed until some settling has taken place. No slurry process could have been performed, but the resulting distribution (Table III) indicates that durene did precipitate as thiourea adduct.

TABLE III.—PRECIPITATION OF DURENE WITHOUT METHYLCYCLOHEXANE

| Substance | Charged, g. | Liquid, g.[1] | Solid, g. |
|---|---|---|---|
| Thiourea | 5.0 | | 5.0 |
| 2-methoxyethanol | 4.83 | 4.83 | |
| Xylene | 10.4 | 10.4 | |
| Durene | 1.04 | 0.45 | .59 |
| | 21.3 | 18.0 | 5.59 |

[1] Some thiourea probably dissolved in liquid, but no precise estimate was made.

Thus, comparing Examples 1 and 3 it is readily apparent that the presence of the methylcyclohexane was essential to a successful operation; without the methylcyclohexane two separate liquid layers were not formed. The separate layers are essential to the slurry procedure which produces a continuous process for the removal of durene.

Although this invention has been described with some degree of particularity it is intended only to be limited by the appended claims.

What is claimed is:

1. In a process for the selective separation of at least one separable feedstream constituent contained in a liquid feedstream mixture which comprises contacting said feedstream in a contacting zone with a substance capable of forming an insoluble inclusion compound with the separable constituent of said feedstream and an anhydrous, inert solvent, wherein said solvent is partially soluble in at least one constituent of said feedstream so that at equilibrium a single liquid phase, in equilibrium with the inclusion compound is formed, said liquid phase comprising said inert solvent and said feedstream depleted in said separable constituent, the improvement which comprises adding to said contacting zone an addition compound which reduces the solubility of the solvent in said feedstream and which is capable of forming an insoluble inclusion compound with said host whereby the formation of two liquid phases in equilibrium with the inclusion compound is encouraged, one liquid phase comprising a major portion of said feedstream depleted in separable feed constituent and the other liquid phase comprising a major portion of the solvent associated with said inclusion compound as a slurry.

2. The process of claim 1 wherein said substance which is capable of forming an insoluble inclusion compound is selected from the group consisting of urea and thiourea.

3. The process of claim 1 wherein the separable feed constituent is durene.

4. The process of claim 1 wherein the solvent is selected from the group consisting of liquid ether alcohols having the general formula R—O—R'—OH wherein R is selected from the group consisting of alkyl and alkoxy radicals and R' is an alkylene radical and liquid polyols having from 2 to about 6 carbon atoms.

5. The process of claim 4 wherein said addition compound is a cyclic compound selected from the group consisting of methylcyclohexane, cyclohexane, cyclopentane and cyclooctane.

6. In a process for the selective separation of durene from a liquid feedstream containing at least one other aromatic compound which comprises contacting the feedstream with a substance capable of forming an insoluble inclusion compound with said durene and an anhydrous inert solvent substantially soluble in said aromatic, wherein said insoluble inclusion compound is formed and exists in equilibrium with a single liquid phase comprising said inert solvent and said feedstream depleted in said durene, the improvement which comprises adding to said contacting zone an addition compound which reduces the solubility of said solvent in said aromatic constituent of said feedstream and which is capable of forming an insoluble inclusion compound with said substance which is capable of forming said inclusion compound whereby the formation of two liquid phases in equilibrium with the inclusion compound is encouraged, one liquid phase comprising a major portion of said feed mixture depleted in said durene and the other liquid phase comprising a major portion of said solvent associated with said inclusion compound as a slurry.

7. The process of claim 6 wherein said addition compound is selected from the group consisting of methylcylohexane, cyclopentane, cyclohexane and cyclooctane.

8. The process of claim 6 wherein said addition compound is methylcyclohexane.

9. The process of claim 6 wherein the solvent is selected from the group consisting of liquid ether alcohols having the general formula R—O—R'—OH wherein R is selected from the group consisting of alkyl and alkoxy radicals and R' is an alkylene radical and liquid polyols.

10. The process of claim 6 wherein said solvent is 2-methoxyethanol.

11. The process of claim 6 wherein said contacting takes place at a temperature of —30 to 120° C.

12. The process of claim 6 wherein said liquid layers are separated, adding sufficient addition compound to said slurry layer to displace the durene from said inclusion compound and recovering said durene from said slurry.

13. The process of claim 12 wherein said addition compound is methycyclohexane.

14. The process of claim 13 wherein the temperature of the slurry is maintained at 50 to 100° C. while said durene is displaced.

15. The process of claim 14 wherein said substance which is capable of forming an insoluble inclusion compound is selected from the group consisting of urea and thiourea.

References Cited

UNITED STATES PATENTS

| | | |
|---|---|---|
| 2,637,681 | 5/1953 | Arnold et al. |
| 2,653,122 | 9/1953 | Arnold et al. |
| 3,103,541 | 9/1963 | Smith et al. |
| 3,410,923 | 11/1968 | Strand et al. |
| 3,448,040 | 6/1969 | Little et al. |

DELBERT E. GANTZ, Primary Examiner

C. R. DAVIS, Assistant Examiner

U.S. Cl. X.R.

208—25; 260—96.5